United States Patent
Knepper et al.

(10) Patent No.: US 8,152,677 B2
(45) Date of Patent: Apr. 10, 2012

(54) HIGH RATIO ECCENTRIC PLANETARY TRACTION DRIVE TRANSMISSION

(75) Inventors: Richard Knepper, North Canton, OH (US); Xiaolan Ai, Massillon, OH (US)

(73) Assignee: The Timken Company, Canon, OH (US)

( * ) Notice: Subject to any disclaimer, the term of this patent is extended or adjusted under 35 U.S.C. 154(b) by 875 days.

(21) Appl. No.: 12/293,014

(22) PCT Filed: Mar. 16, 2007

(86) PCT No.: PCT/US2007/064224
§ 371 (c)(1), (2), (4) Date: Sep. 15, 2008

(87) PCT Pub. No.: WO2007/109575
PCT Pub. Date: Sep. 27, 2007

(65) Prior Publication Data
US 2009/0048052 A1    Feb. 19, 2009

Related U.S. Application Data

(60) Provisional application No. 60/783,508, filed on Mar. 17, 2006.

(51) Int. Cl.
*F16H 13/06* (2006.01)
(52) U.S. Cl. ........................................ 475/183
(58) Field of Classification Search .............. 475/162, 475/165, 183, 185, 335; 74/640
See application file for complete search history.

(56) References Cited

U.S. PATENT DOCUMENTS

| | | | |
|---|---|---|---|
| 1,093,922 | A | 4/1914 | Dieterich |
| 3,380,312 | A | 4/1968 | Barske |
| 3,478,623 | A | 11/1969 | Noguchi |
| 3,848,476 | A | 11/1974 | Kraus |
| 3,945,270 | A | 3/1976 | Nelson et al. |
| 4,481,842 | A | 11/1984 | Nelson |

(Continued)

FOREIGN PATENT DOCUMENTS
WO    2007109575    9/2007

*Primary Examiner* — Justin Holmes
(74) *Attorney, Agent, or Firm* — Polster, Lieder, Woodruff & Lucchesi, L.C.

(57) ABSTRACT

A traction drive transmission has an outer ring 40, a sun roller 10, support rollers 30, and one or more loading rollers 20. The outer ring 40 includes a raceway 42 presented inwardly. The sun roller 10 includes a raceway 12 presented outwardly toward the raceway 42 of the outer ring 40. The sun roller 10 is offset eccentrically with respect to the outer ring 40 so that a wedge gap 112 exists between the raceways 42, 12 of the outer ring 40 and sun roller 10. The support rollers 30 are located between the outer ring 40 and sun roller 10. Each support roller 30 has first and second raceways 36, 38 that have different diameters and contacts the raceway 12 of the sun roller 10 along its first raceway 36 and the raceway 42 of the outer ring 40 along its second raceway 38. Each loading roller 20 is located at the wedge gap 112 between the raceway 42 of the outer ring 40 and the raceway 12 of the sun roller 10. Each loading roller 20 has first and second circular raceways 22, 26 that have different diameters and contacts the raceway 12 of the sun roller 10 along its first raceway 22 and the raceway 42 of the outer ring 40 along its second raceway 26.

28 Claims, 16 Drawing Sheets

Section A-A

U.S. PATENT DOCUMENTS

| | | | |
|---|---|---|---|
| 4,483,216 | A | 11/1984 | Takahashi et al. |
| 4,555,963 | A | 12/1985 | Nelson |
| 4,709,589 | A | 12/1987 | Kraus |
| 5,021,035 | A | 6/1991 | Zhou |
| 5,931,759 | A | 8/1999 | Otaki et al. |
| 6,406,399 | B1 | 6/2002 | Ai |
| 6,595,884 | B1 | 7/2003 | Ai et al. |
| 6,702,704 | B2 | 3/2004 | Ai |
| 6,981,930 | B2 | 1/2006 | Ai et al. |
| 7,018,316 | B2 | 3/2006 | Ai |
| 7,029,414 | B2 | 4/2006 | Ai et al. |
| 7,153,230 | B2 | 12/2006 | Ai |
| 2004/0067811 | A1* | 4/2004 | Ai ................ 475/183 |

* cited by examiner

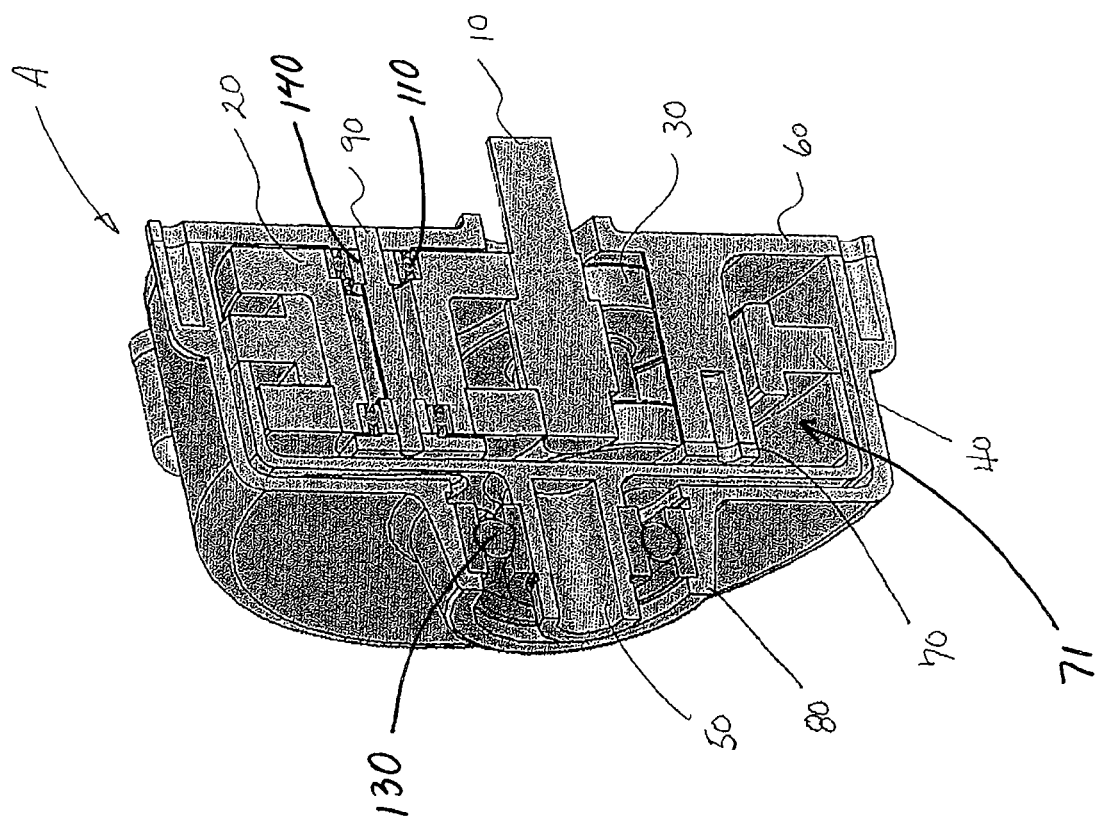

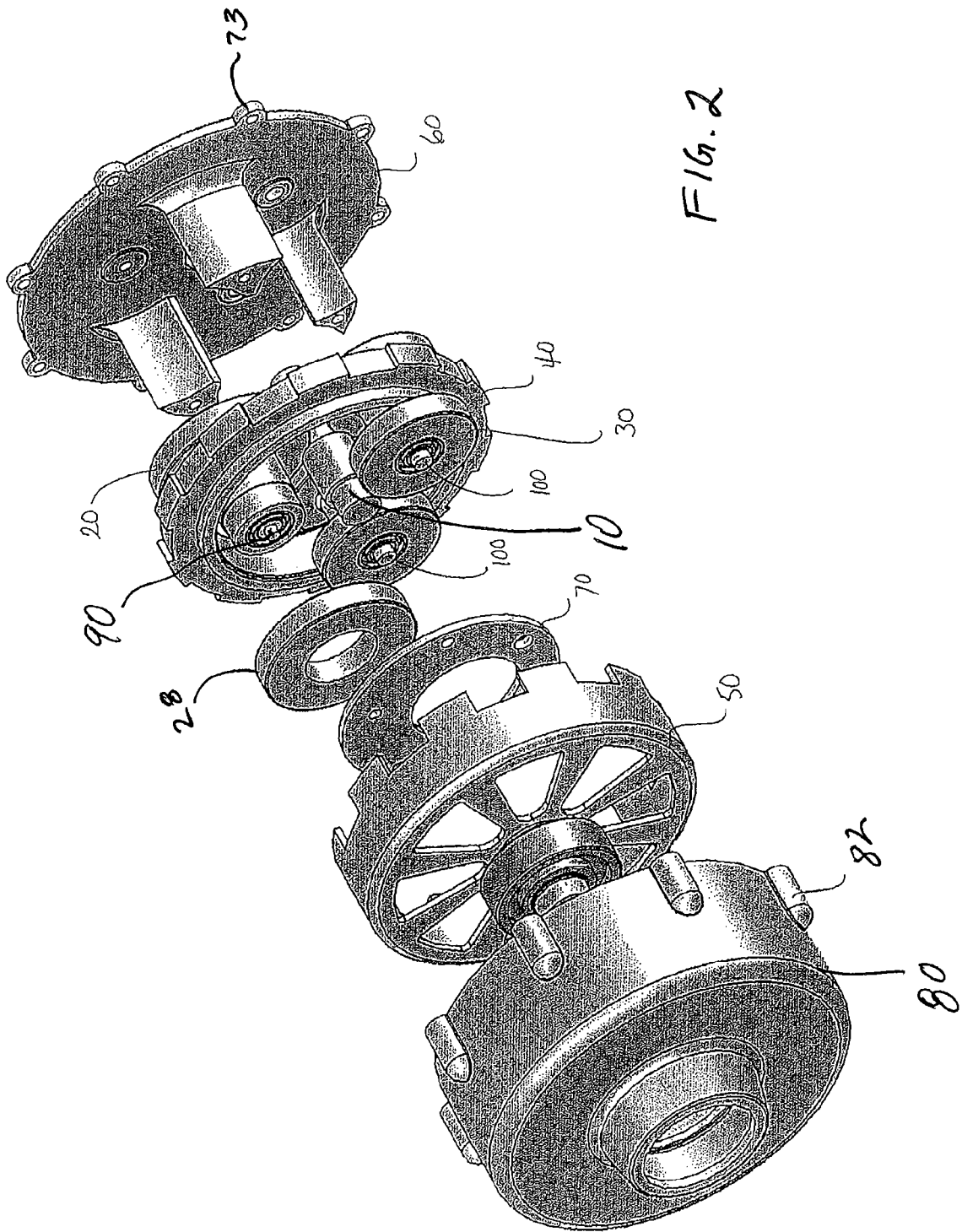

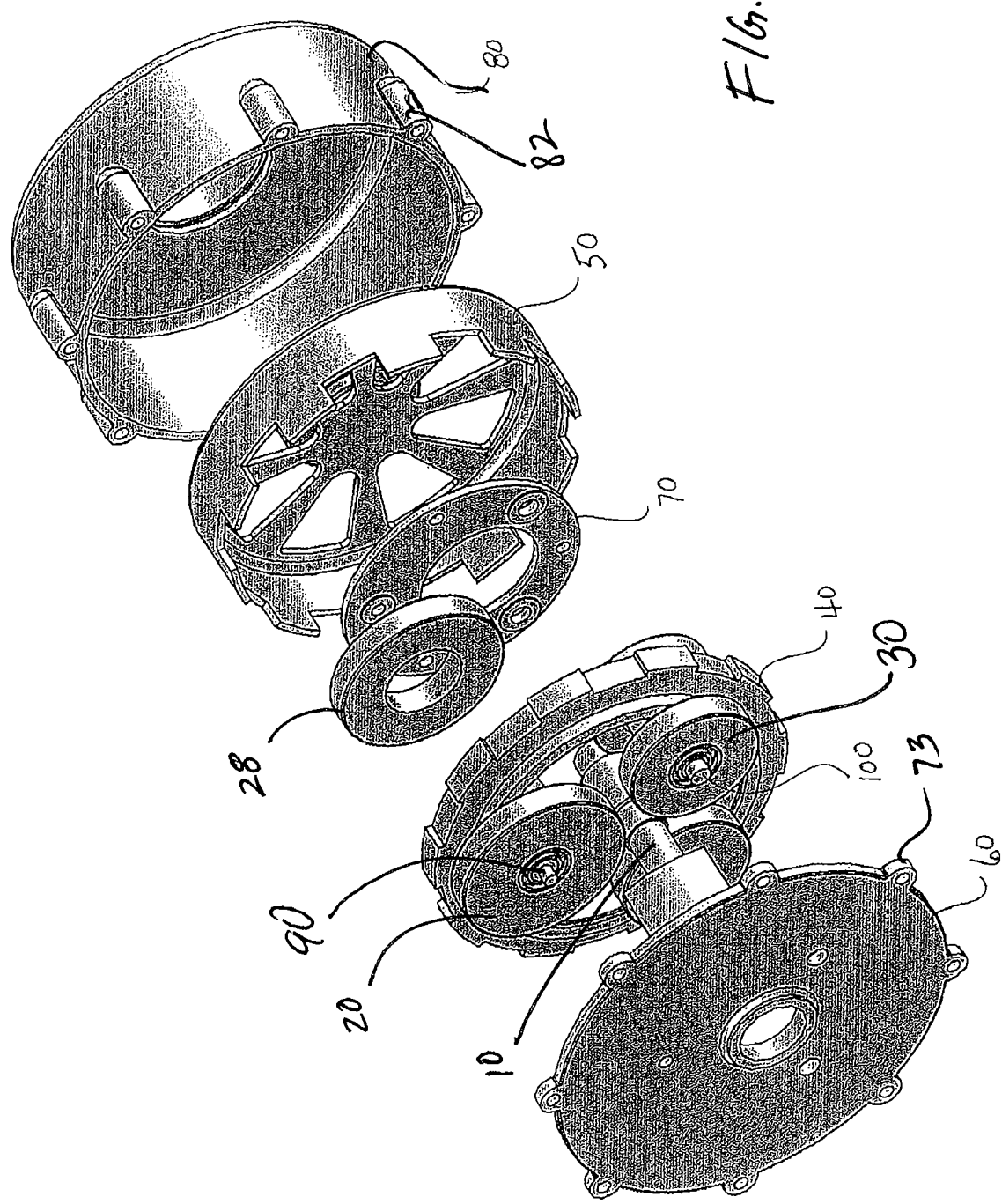

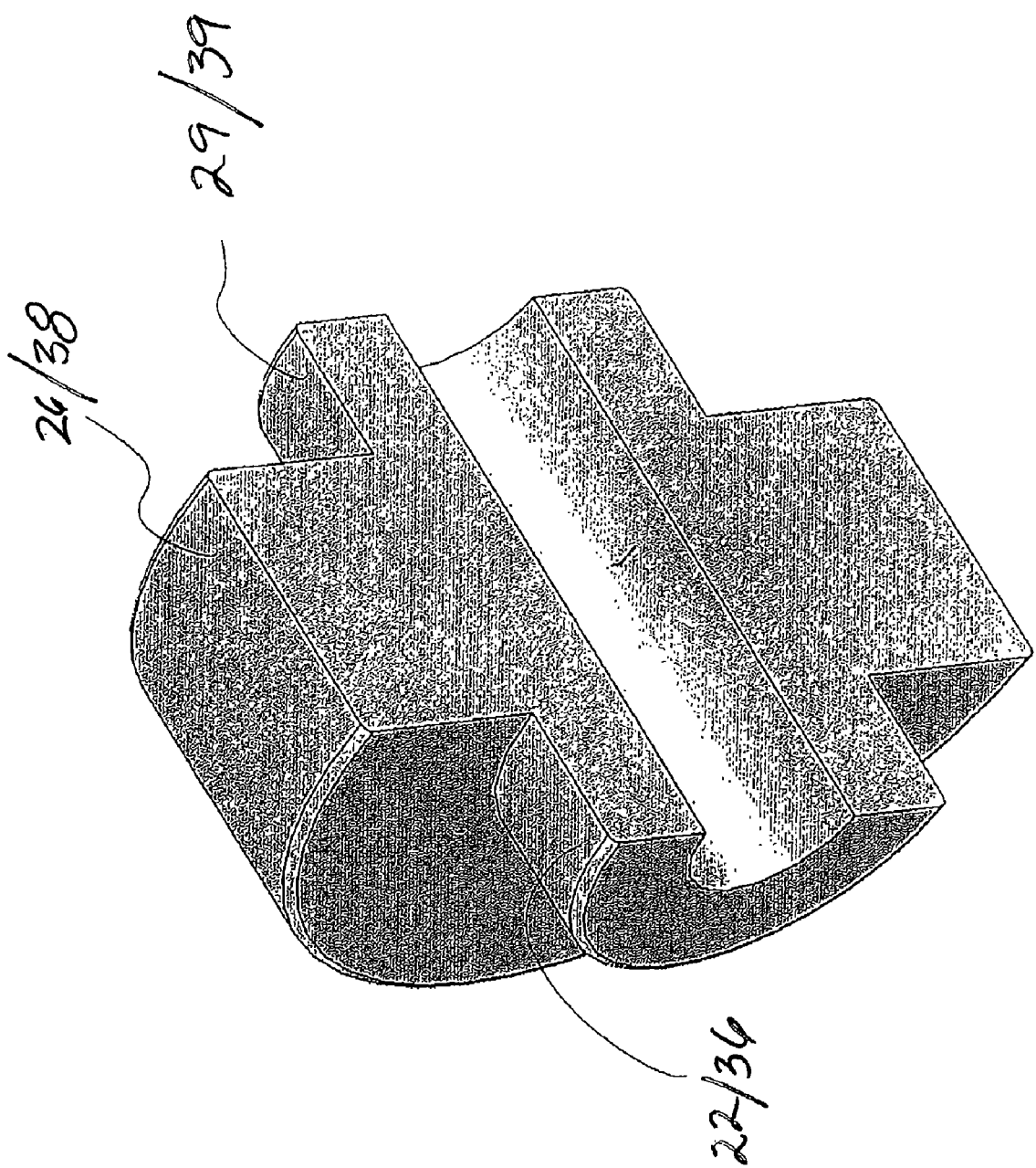

HIGH RATIO ECCENTRIC PLANETARY TRACTION DRIVE TRANSMISSION

CROSS-REFERENCE TO RELATED APPLICATIONS

This application claims the benefit of U.S. Provisional Application No. 60/783,508, entitled HIGH RATIO ECCENTRIC PLANETARY TRACTION DRIVE TRANSMISSION, filed on Mar. 17, 2006. The disclosure of the above application is incorporated herein by reference.

TECHNICAL FIELD

The present disclosure relates to transmissions and, more specifically, to traction drive transmissions.

BACKGROUND ART

The statements in this section merely provide background information related to the present disclosure and may not constitute prior art.

Traction drives utilize frictional force to transmit torque and power. Because the power is transmitted between two smooth surfaces, often through a thin layer of lubricant, a traction drive possesses unique characteristics that are not readily attainable by gear drives. The desired performance characteristics include quietness, high-efficiency, high rotational accuracy and zero-backlash.

According to the speed ratio change, traction drives can be classified into variable ratio drives and fixed ratio drives. Fixed ratio drives are often used as speed step-down or speed step-up units in various applications. The designs of the fixed ratio traction drives are in general simpler and the performance is more rugged than the variable ratio traction drives. The unique performance features, alone with inherit low manufacturing cost, have rendered traction drives a host of potential applications.

Generating adequate normal force at the frictional contacts is essential for traction drive transmissions. Planetary configurations are perhaps the most preferred arrangements for fixed ratio traction drives because the internal forces are often self-balanced. Various concepts have been proposed in the past to provide loading mechanisms.

Eccentric cylindrical planetary design offers one of the most effective means to generated torque-actuated normal force. By offsetting the outer ring eccentric to the sun roller, a convergent wedge gap is created along the annular space between the outer ring and the sun roller. When a planetary roller is in the converged wedge gap, frictional forces at the contacts tend to pull the planetary roller towards the smaller end of the gap, wedging the roller against the outer ring and the sun roller. An appreciable amount of normal load is thus generated at the frictional contacts. The normal load is in direct proportion to the applied torque load. The wedge loading concept was disclosed by Dieterch in U.S. Pat. No. 1,093,922, and was improved by others including Nelson in U.S. Pat. No. 3,945,270 and Ai in U.S. Pat. No. 6,981,930.

For practical considerations, the eccentric cylindrical designs disclosed in the prior art, were confined mostly to a speed ratio, defined as raceway diametrical ratio of the outer ring to the sun roller, less than 8:1. As the speed ratio increases, the effective contact radius at the contact between the planetary roller and sun roller becomes undesirable. This leads to a significant increase in contact stress and reduction in service life.

Therefore, it is highly desirable to provide a improved design that maintains a torque actuated loading mechanism and appreciably extends the speed ratio beyond the current practice with eccentric cylindrical traction drive

SUMMARY OF THE INVENTION

The inventor hereof has succeeded at designing a traction drive with extended speed ratios including those with greater than an 8:1 ratio. Some embodiments provide a simple, effective design configuration that will extend appreciably the speed ratio for eccentric cylindrical planetary traction drives. In other embodiments, a set of geometry relationships help to provide frictional self-loading for planetary traction drives.

According to one aspect, a traction drive transmission including an outer ring, a sun roller, support rollers, and one or more loading rollers. The outer ring includes a raceway presented inwardly. The sun roller includes a raceway presented outwardly toward the raceway of the outer ring. The sun roller is offset eccentrically with respect to the outer ring so that a wedge gap exists between the raceways of the outer ring and sun roller. The support rollers are located between the outer ring and sun roller. Each support roller has first and second raceways that have different diameters. Each support rollers contacts the raceway of the sun roller along its first raceway and the raceway of the outer ring along its second raceway. Each loading roller is located at the wedge gap between the raceway of the outer ring and the raceway of the sun roller. Each loading roller has first and second raceways that have different diameters. Each loading roller contacts the raceway of the sun roller along its first raceway and the raceway of the outer ring along its second raceway.

According to another aspect, a traction drive transmission including an outer ring having a circular raceway presented inwardly and a sun roller having two circular raceways presented outwardly toward the raceway of the outer ring and being offset eccentrically with respect to the outer ring so that a wedge gap exists between the raceways of the outer ring and sun roller. Support rollers are located between the outer ring and sun roller and have first, second and third raceways. The second raceway being positioned between the first and third raceways. The diameters of the first and third raceways are substantially equal and different than the diameter of the second raceways. The support rollers contacting the raceway of the sun roller along its first raceways and third raceways and the raceway of the outer ring along its second raceways. At least one loading roller is located at the wedge gap between the raceways of the outer ring and sun roller. Each loading roller includes first, second, and third circular raceways with the second raceway being positioned between the first and third raceways. The diameters of the first and third raceways are substantially equal and different than the diameter of the second raceways. Each loading roller contacts the raceway of the sun roller along the first raceways and third raceways and the raceway of the outer ring along the second raceways.

According to yet another aspect, a traction drive transmission including means for contacting a raceway of a sun roller having the raceway presented outwardly and being offset eccentrically with respect to an outer ring so that a wedge gap exists between an internally presented raceway of the outer ring and the first raceway of the sun roller and means for contacting the raceway of the outer ring. The means for contacting the raceway of the outer ring has a diameter that is different than the diameter of the means for contacting the raceway of the sun roller.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 1 is cutaway perspective view of a traction drive according to one exemplary embodiment.

FIG. 2 is an exploded front perspective view of the traction drive according to the exemplary embodiment of FIG. 1.

FIG. 3 is an exploded back perspective view of the traction drive according to the exemplary embodiment of FIGS. 1 and 2.

FIG. 16 is a cutaway perspective view of a roller for a traction drive according to another exemplary embodiment.

It should be understood that throughout the drawings, corresponding reference numerals indicate like or corresponding parts and features.

DETAILED DESCRIPTION

Figure 4B:
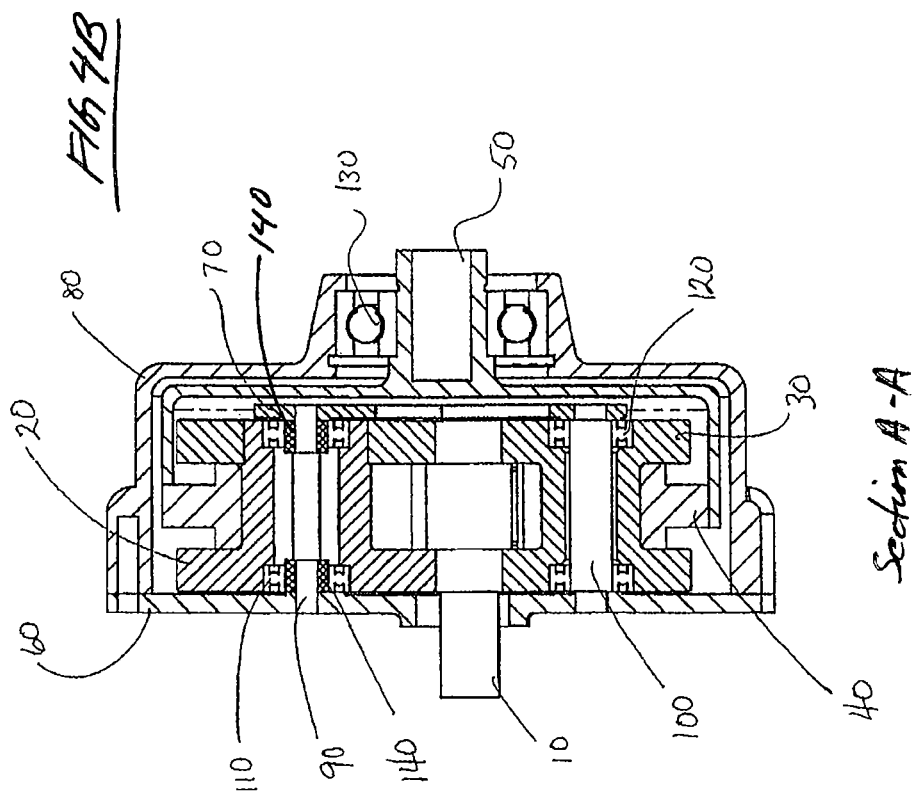
FIG. 4B is an oblique cross sectional view of the traction drive according to the exemplary embodiment of FIGS. 1, 2, 3, and 4A.
Figure 4A:
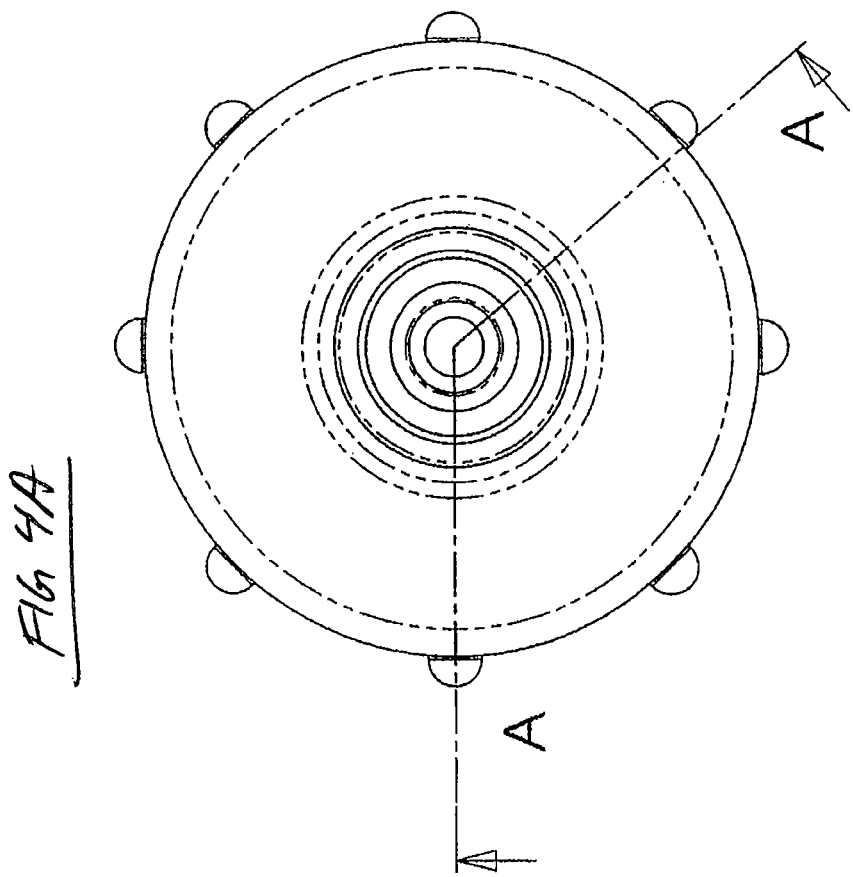
FIG. 4A is a front view of the traction drive according to the exemplary embodiment of FIGS. 1, 2, and 3.

The following description is merely exemplary in nature and is not intended to limit the present disclosure or the disclosure's applications or uses.

In one exemplary embodiment, a traction drive transmission has an outer ring, a sun roller, support rollers, and one or more loading rollers. The outer ring includes at least one circular raceway presented inwardly. The sun roller includes at least one raceway presented outwardly toward the raceways of the outer ring. The sun roller is offset eccentrically with respect to the outer ring so that a wedge gap exists between the raceways of the outer ring and sun roller. The support rollers are located between the outer ring and sun roller. Each support roller has at least first and second raceways with at least two different diameters. At least the first raceway contacts a raceway of the sun roller along its first raceway and the second raceway contacts a raceway of the outer ring. Of course additional raceways can also be provided for providing more than one contact to more than one raceway of one or both of the outer ring and the sun roller.

Each loading roller is located at the wedge gap between the raceway of the outer ring and the raceway of the sun roller. Each loading roller has first and second circular raceways that have different diameters and contacts the raceway of the sun roller along its first raceway and the raceway of the outer ring along its second raceway. The raceways can be of any design or shape and in some embodiments are cylindrical.

Additionally, a pin shaft assembly having a cylindrical shaft can be provided for mounting the loading rollers within the wedge gap. Such pin shaft assembly can include one or more elastic bearing seats that are positioned about its shaft for flexibly mounting the loading roller. Each elastic bearing seats is dimensioned for seating a bearing on which the loading rollers are mounted. In this manner, the loading roller can move within the wedge gap to change the contacts with the sun roller and the outer ring for providing varying levels of traction. Of course, in such embodiments a bearing is positioned in each bearing seat.

In some embodiments, the outer diameters of the first raceways for each of the loading roller and each support roller is greater than an outer diameter for the corresponding second raceways. In these embodiments, the traction drive ratio can be increased greater than a typical 8:1 ratio and can be increased to more than a 12:1 ratio. In other embodiments, the outer diameters of the first raceways for each of the loading roller and each support roller can be less than an outer diameter for the corresponding second raceways. In these embodiments, the traction drive ratio can be reduced if a particular application so requires a reduced ratio with corresponding torque.

In some embodiments, an outer ring hub that is separate than the outer ring is provided. The outer ring hub can provide a shaft for interconnecting the outer ring and the rotation forces of the outer ring to a working environment. In such embodiments, the outer ring can be fixedly or flexibly attached to the outer ring hub. In one embodiment, the outer ring includes a plurality of alternating extrusions and recesses forming teeth that are presented outwardly on its outer diameter. The outer ring hub can includes recesses forming corresponding teeth on the outer ring hub that are configured for coupling with the teeth of the outer ring for providing a coupling between the outer ring and the outer ring hub.

A carrier subassembly can be configured during assembly that includes a carrier base that has an orifice for receiving one end of the sun roller. A carrier plate is attached to the carrier base to form a chamber between the carrier base and the carrier plate. The outer ring, loading rollers, support rollers, sun roller, pin shaft assembly and pin shafts are positioned between the carrier base and the carrier plate within the chamber. The carrier base and the carrier plate include mounting configuration for mounting an end of each pin shaft assembly and pin shaft.

A housing can be attached to the carrier base for enclosing the carrier subassembly. The housing can include a shaft hole for receiving the shaft of the outer ring hub. When the housing is mounted to the carrier base, the outer ring hub and the carrier assembly are enclosed between the carrier base the housing. The outer ring hub is engaged with the outer ring for imparting rotation there between. The shaft of the outer ring hub is parallel and offset eccentrically from the sun roller.

As noted in some embodiments, a traction drive transmission can include a sun roller having two circular raceways presented outwardly toward the raceway of the outer ring. The support rollers can have first, second and third raceways, wherein the second raceway is positioned between the first and third raceways. The diameters of the first and third raceways can be substantially equal and different than the diameter of the second raceways. The first and third raceways of the support rollers can contact a circular raceway of the sun roller and contact the raceway of the outer ring along their second raceways. Each loading roller also includes first, second, and third circular raceways with the second raceway being positioned between the first and third raceways. For the loading roller, the diameters of the first and third raceways are substantially equal and different than the diameter of the second raceways. Each loading roller contacts a raceway of the sun roller along the first raceways and third raceways and the raceway of the outer ring along the second raceways. The diameters of each roller are such that in some embodiments, a first ratio defined by the diameter of the first raceway to the second raceway of the support rollers is substantially equal to a second ratio defined by the diameter of the first raceway to the second raceway of each loading roller. As noted above, the first and third raceways of each of the support rollers and the loading roller can have outer diameters greater than or less than an outer diameter of the second raceways.

The sun roller can includes a first raceway, a second raceway, and an intermediate portion, such as a circular surface, by way of example, that separates the second raceway from the first raceway. In such cases, the first raceway of each loading roller can contact the first raceway of the sun roller and the third raceway of each loading roller can contact the second raceway of the sun roller.

Referring now to FIGS. 1 through 4, in one exemplary embodiment a cylindrical planetary traction drive A has a sun roller 10, a loading roller 20, two support rollers 30, an outer ring 40, an outer ring hub 50, a carrier base 60, a carrier plate 70, and a housing 80. A carrier subassembly 71 in enclosed by the housing 80 and includes the sun roller 10, the loading roller 20, the two support rollers 30, the carrier base 60 and the carrier plate 70.

The loading roller 20, shown as a single loading roller by way of example, is flexibly supported by bearings 110 and by a pin-shaft assembly 90 that defines an axis about which the loading roller 20 rotates. The pin-shaft assembly 90 can be flexible to provide for a movement of its axis an the loading roller 20 within the wedge gap. The support rollers 30 are firmly supported by pin shafts 100 and can also be supported by bearings 120.

Figure 5:
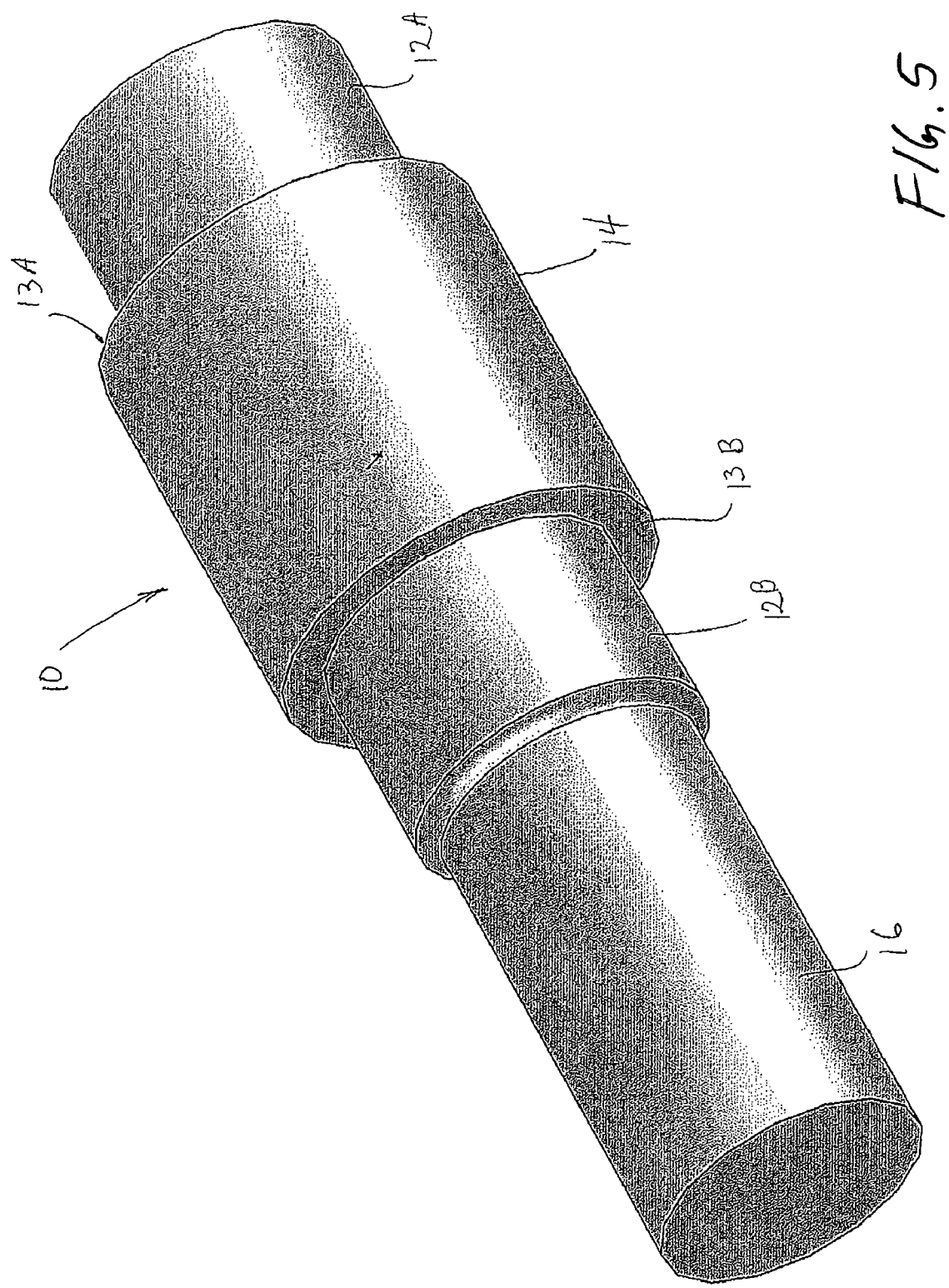
FIG. 5 is a perspective view of a sun roller having two raceways suitable for use in some traction drives according to one exemplary embodiment.

The sun roller 10, as shown by way of example in FIG. 5, can include cylindrical raceways 12A and 12B that can be separated by an intermediate portion, such as a cylindrical surface 14, e.g., the intermediate portion can be interposed between the two raceways 12 of the sun roller 10. In such embodiments, shoulders 13A and 13B can be formed at the junctions between the intermediate portion and each of the raceways 12A, 12B. The sun roller 10 further contains a shaft 16 for external coupling a device for providing or receiving rotation to or from the sun roller 10. The two raceways 12A and 12B can have substantially the same in diameter. The intermediate portion or cylindrical surface 14 can have a diameter that is greater than the diameters of the first raceway 12A and the second raceway 12B.

Figure 6:
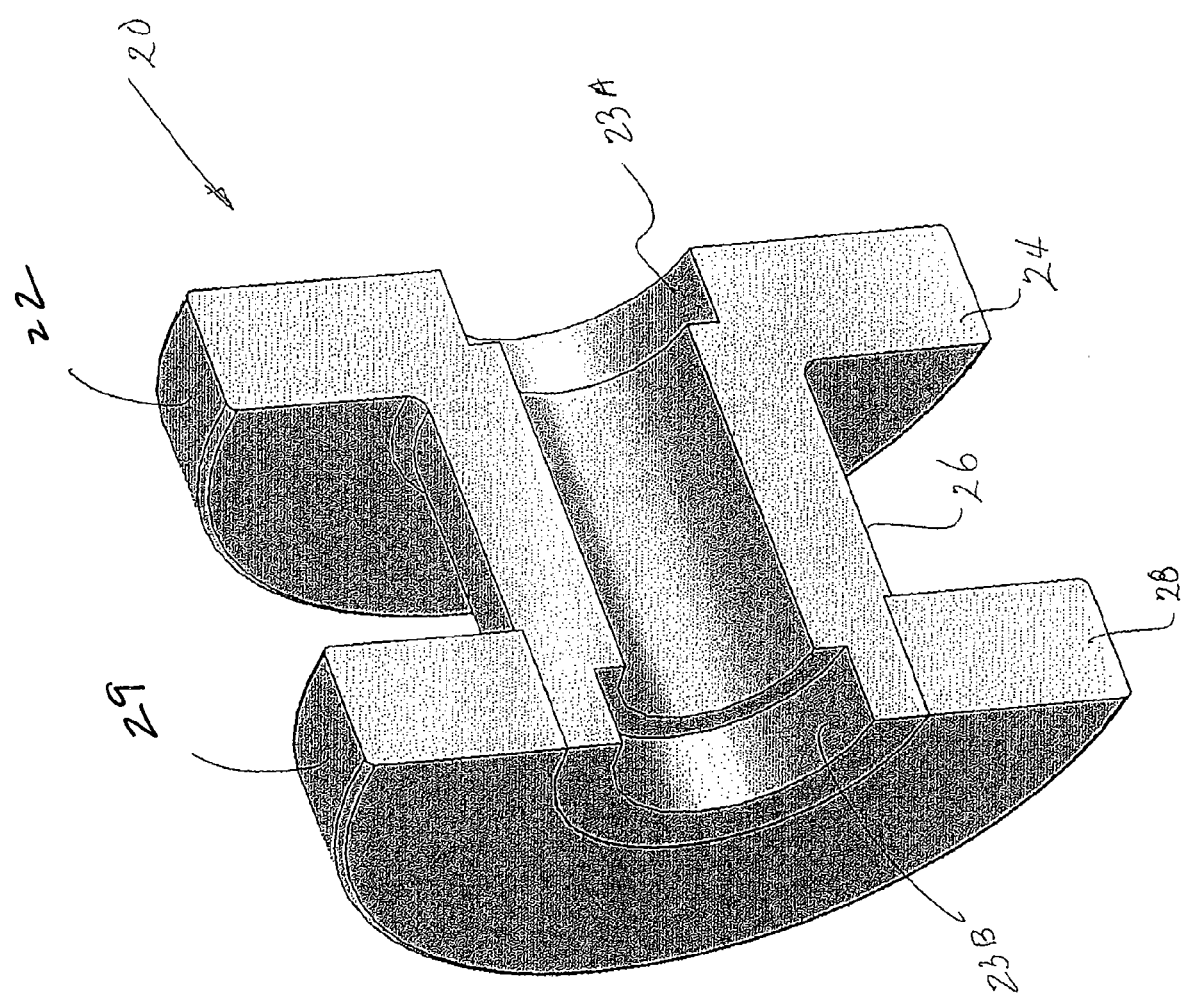
FIG. 6 is a perspective view of a loading roller having two loading planets and three raceways for a traction drive according to one exemplary embodiment.

The loading roller 20, as shown by way of example in FIG. 6, can be a monolithic body or can be made of two or more assembled parts. For example, as shown in FIG. 6, the loading roller 20 can include a base planet 24 and a disc planet 28. The base planet 24 can include the first cylindrical raceway 22 and the second cylindrical raceway 26. The disc planet 28 can include the third cylindrical raceway 29. As noted above, the first and third cylindrical raceways 22 and 29 can have substantially the same outer diameters. Additionally, the loading roller 20 can include recesses 23A and 23B as bearing seats for the bearings 110.

Figure 7:
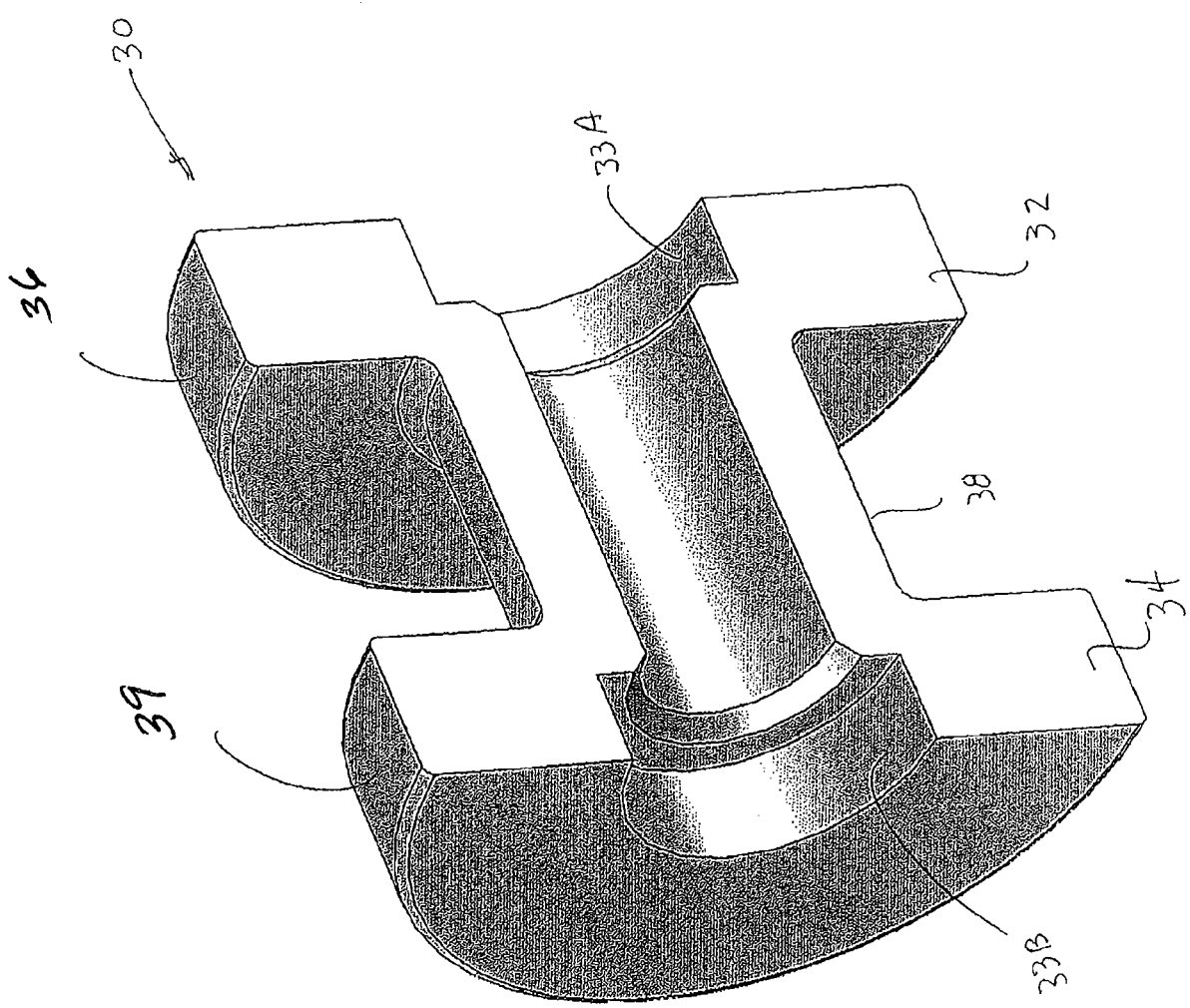
FIG. 7 is a perspective view of a support roller having two support planets and three raceways for a traction drive according to one exemplary embodiment.

Each support roller 30, as shown by way of example in FIG. 7, can be a monolithic body, as shown, or can be assembled from more than one component. The support roller 30 in this example, includes a first planet 32 having a first cylindrical raceway 36, and a second cylindrical raceway 38. Additionally, in some embodiments, a second planet 34 can be positioned on an opposing side of the second raceway 38 and can include a third cylindrical raceway 39. The support rollers 30 can also include one or more recesses 33, shown by way of example as two recesses 33A and 33B, as bearing seats for bearings 120 as shown in FIGS. 1-4.

Figure 8:
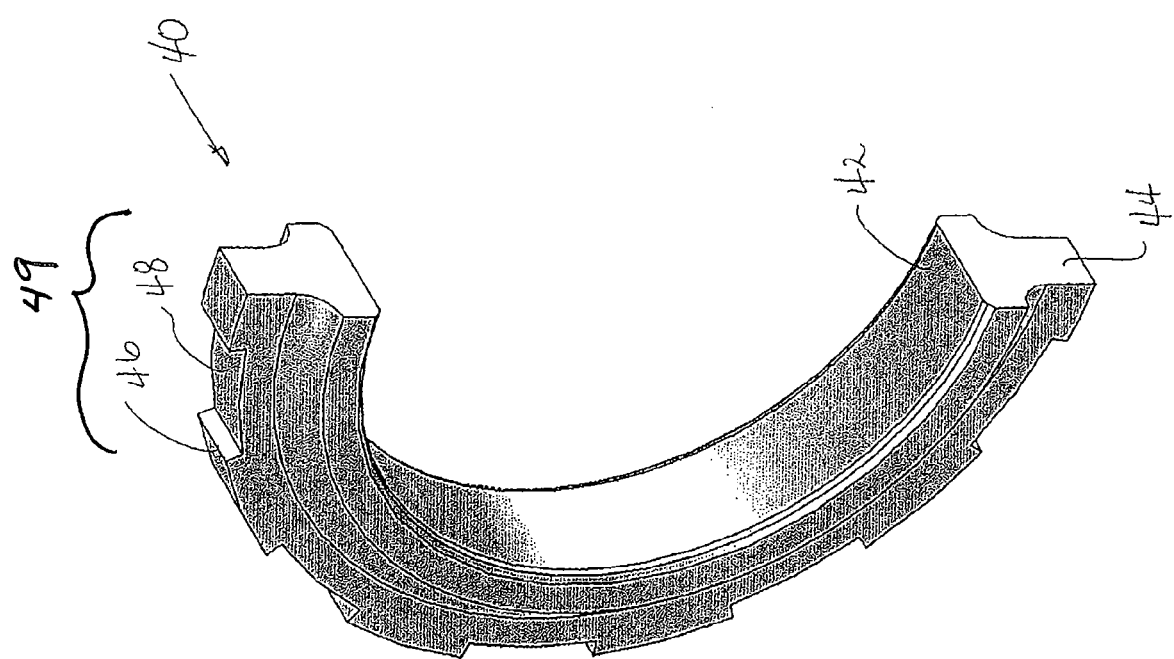
FIG. 8 is a cutaway perspective view of an outer ring having an inner cylindrical raceway and a plurality of teeth for a traction drive according to one exemplary embodiment.

The outer ring 40, as shown by way of example in FIG. 8, includes an inner raceway 42 surrounding and facing an axis of rotation. The outer ring 40 can also include a rib 44 and can include extensions 46 and recesses 48 arranged alternately at an outer diameter of the rib 44. These extensions 46 and recesses 48 can form a set of teeth 49 for coupling with the outer ring hub 50 to transfer rotation and torque.

Figure 9:
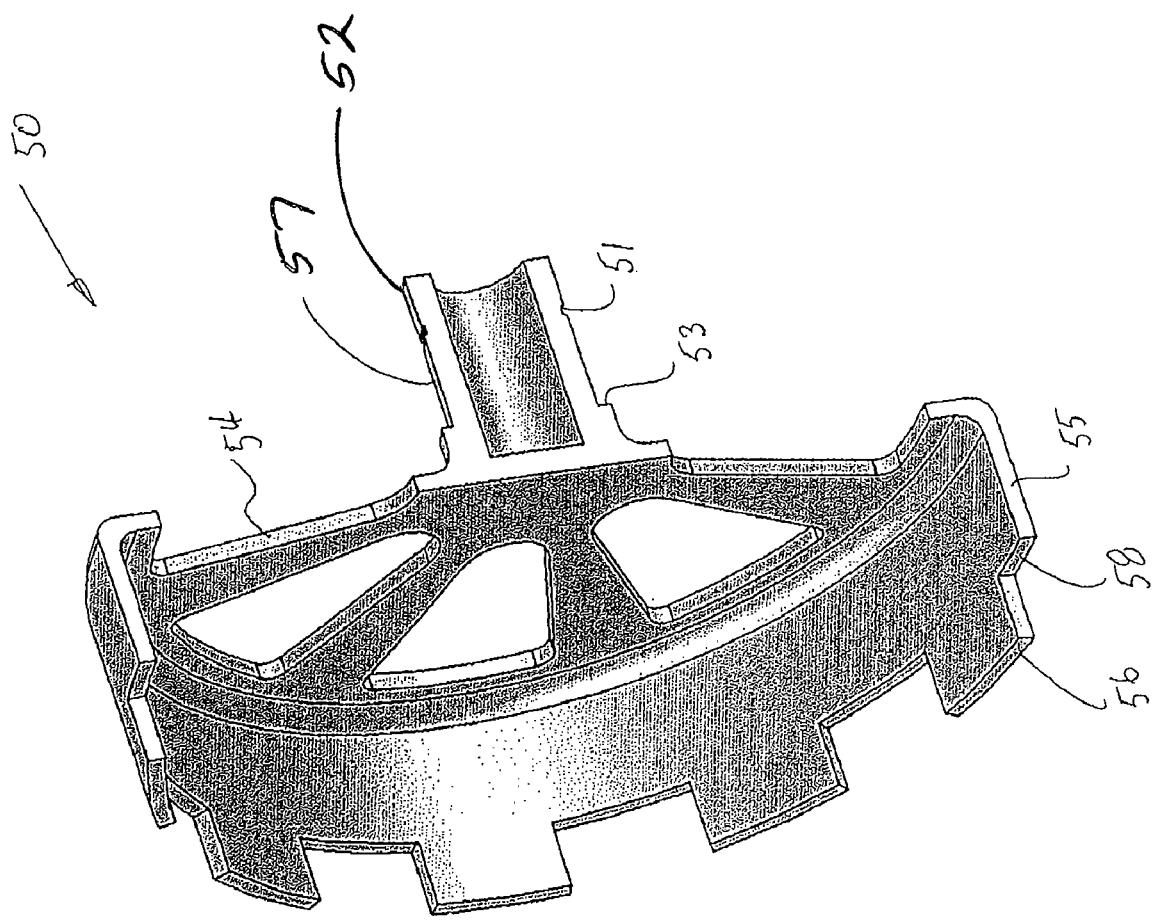
FIG. 9 is a cutaway perspective view of an outer ring hub for a traction drive according to one exemplary embodiment.

The outer ring hub 50, as shown by way of example in FIG. 9, contains a shaft 52, a connecting web 54 and a hub 55. The shaft 52 can have a shoulder 53 and a groove 51 for a snap ring for coupling to a external device for providing or receiving rotation in an operating environment. A bearing seat 57 can also be provided between the shoulder 53 and the groove 51 of the shaft 52. A set of recesses 58 can be cut out to form a set of teeth 56 for coupling with teeth 49 and in particular recesses 48 on the outer ring 40.

Figure 10:
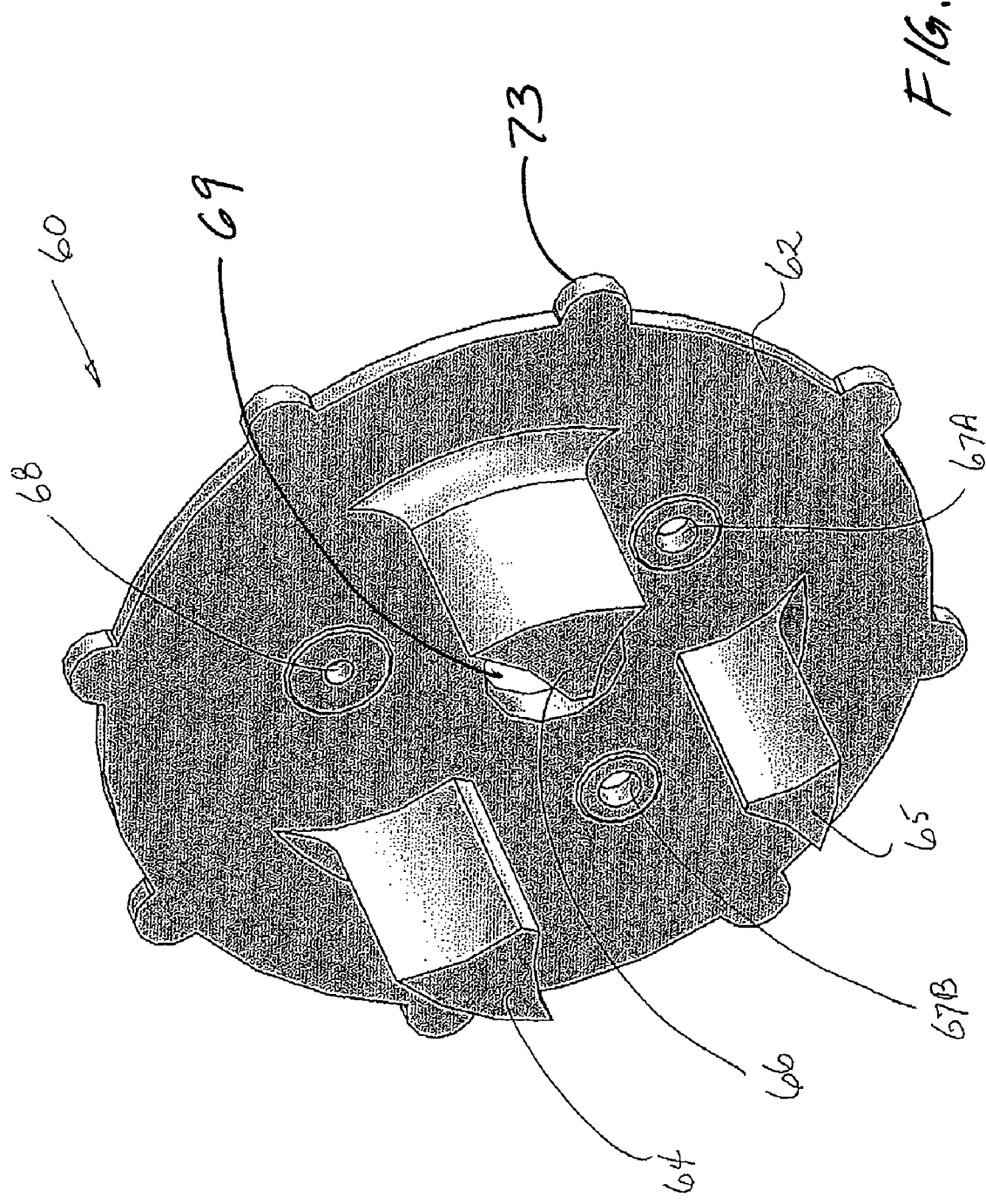
FIG. 10 is a perspective view of a carrier base for a traction drive according to one exemplary embodiment.

The carrier base 60, as shown by way of example in FIG. 10, has a base plate 62 and three bridges 64, 65 and 66 that are perpendicular to the base plate 62. Holes 67A, 67B and 68 can configured for receiving one end of the pin-shaft 100 and the pin shaft assembly 90, as discussed above with regard to FIGS. 1-4. A sun roller orifice 69 can also be provided for receiving the sun roller 10. Ears 73 can be provided for mating with and coupling to ears 82 of the housing 80.

Figure 11:
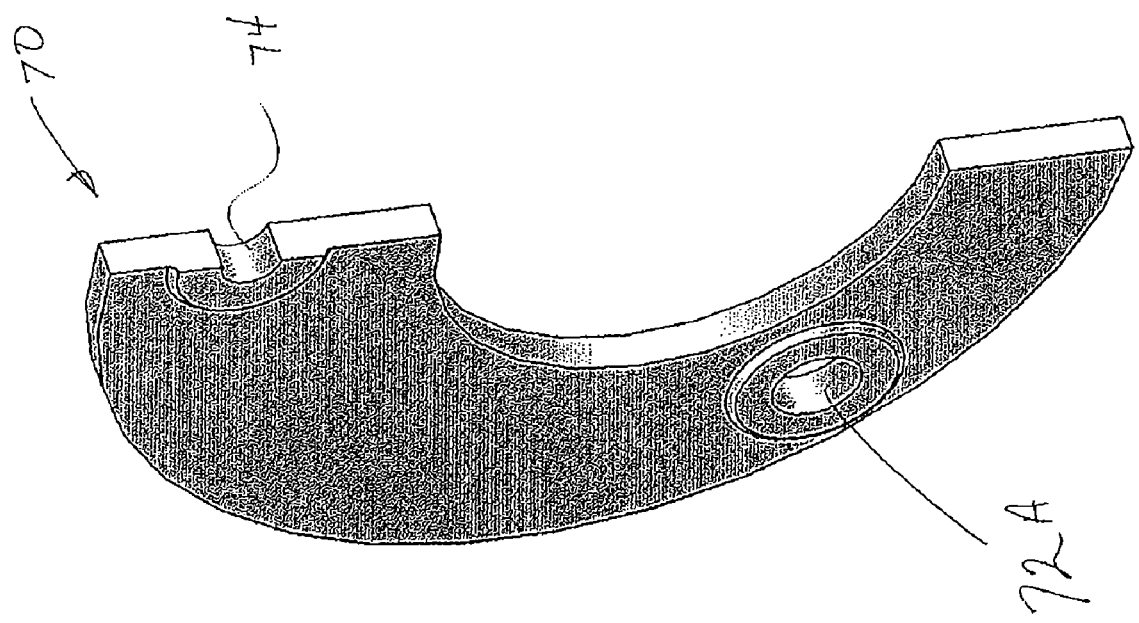
FIG. 11 is a cutaway perspective view of a carrier plate for a traction drive according to one exemplary embodiment.

The carrier plate 70, as shown by way of example in FIG. 11, can include holes 72A, 72B and 74 that correspond to holes 67A, 67B and 68 on the carrier base 60 for receiving other ends of the pin-shafts 100 and the pin shaft assembly 90 for mounting the loading roller 20 and the support rollers 30. The carrier plate 70 can be coupled to the bridges 64, 65, 66 on the carrier base 60 by any suitable coupling method or fastener to form the carrier subassembly 71. This can include, by way of example, a set of bolts (not shown) or screws (not shown), by way of examples.

Figure 12:
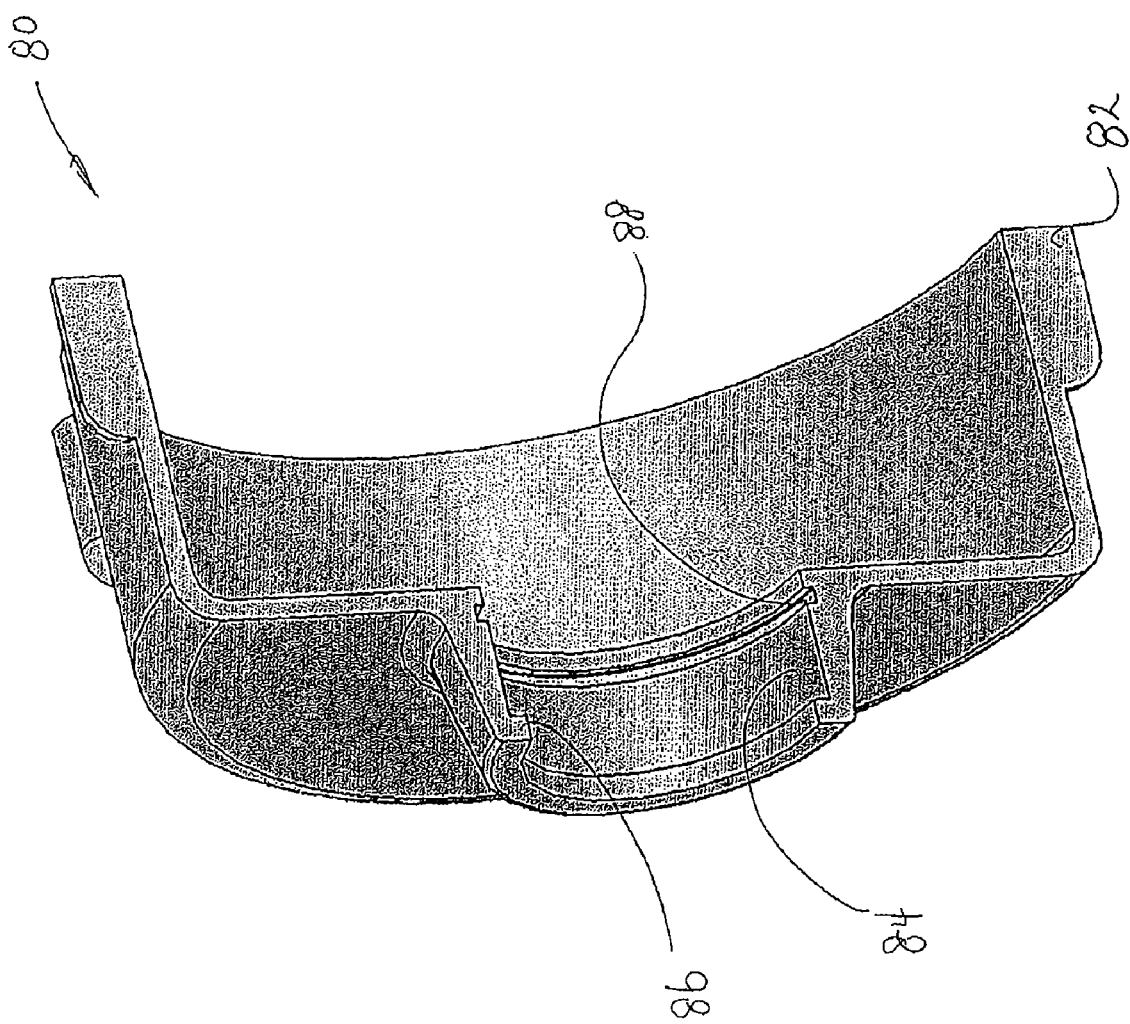
FIG. 12 is a cutaway perspective view of a carrier plate for a traction drive according to one exemplary embodiment.

The housing 80, as shown by way of example in FIG. 12, can be coupled to the carrier base 60 and the ears 82 of the housing can be mated with the ears 73 of the carrier base 60. These can be coupled by any suitable method or fastener and can include a set of bolts that thread into the ears 82 on the housing 80 (not shown). A bearing seat 84 can also be configured to accommodate a bearing 130 that can support the shaft 52 of the outer ring hub 50. The bearing 130 can also be positioned about bearing seat 57 of the outer ring hub 50. A rib shoulder 86 and a groove 88 for a snap ring (not shown) can be provided respectively on the sides of the bearing seat 84. The rib shoulder 86 and the snap ring that fits into the groove 88 can fix the bearing 130 in axial direction.

Figure 13:
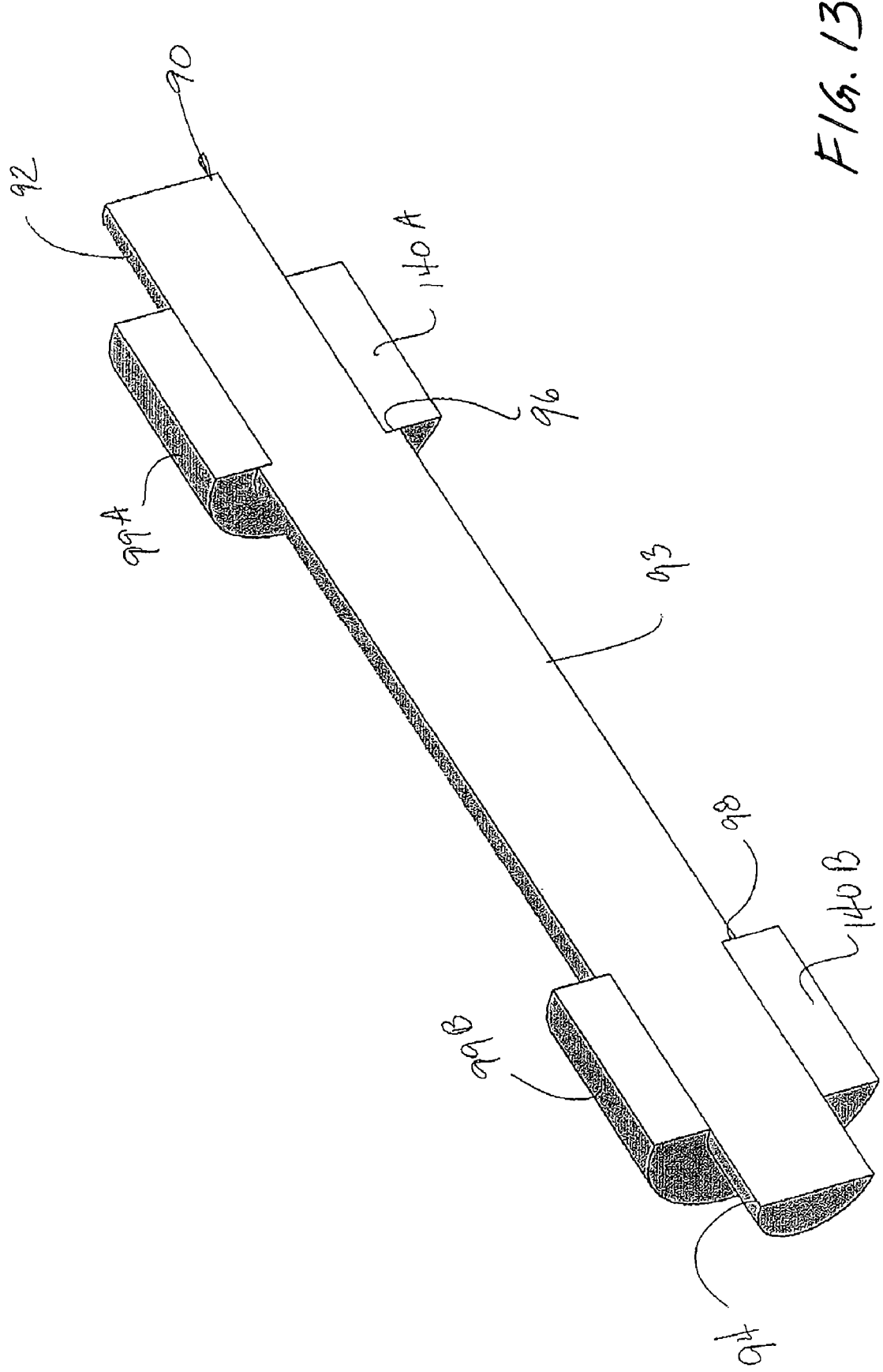
FIG. 13 is a sectioned perspective view of a pin shaft assembly for a traction drive according to one exemplary embodiment.

The pin shaft assembly 90, as shown by way of example in FIG. 13, can include a shaft 93 and one or more flexible bearing seats 99A and 99B. In some embodiments, each flexible bearing seat 99A and 99B can be provided by an elastic inserts 140A and/or 140B, by way of example. The shaft 93 can also have cylindrical surfaces 92, 94 and shoulders 96 and 98 for at least partial axial constraint of the elastic inserts 140A and 140B and or flexible bearing seats 99A and 99B on the shaft 93.

Figure 14:
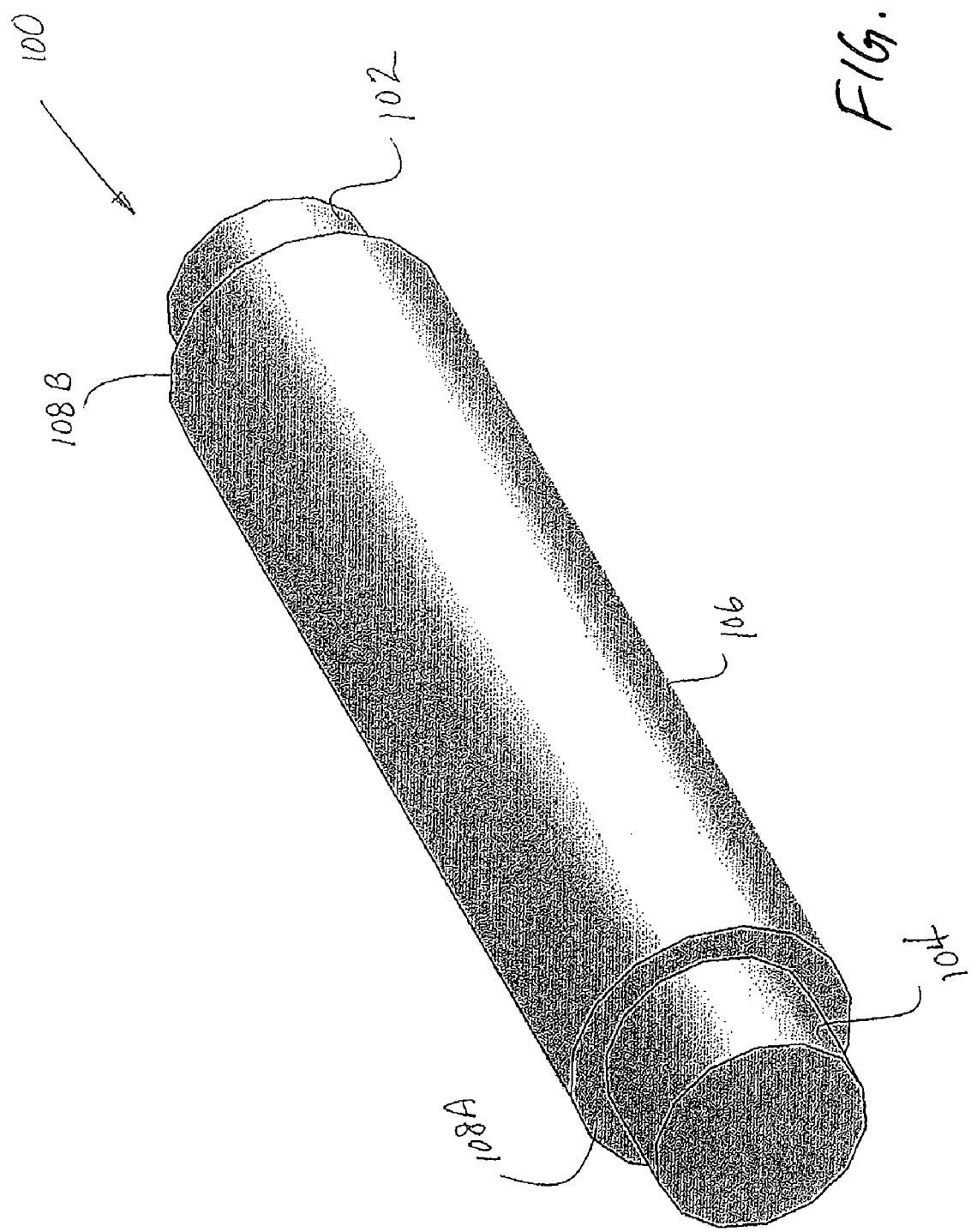
FIG. 14 is an end perspective view of a pin shaft for a traction drive according to one exemplary embodiment.

The pin-shaft 100, as shown by way of example in FIG. 14, is configured to mount the support rollers 30 can have one or more cylindrical surfaces 102 and 104 that can be separated by a intermediate cylindrical surface 106. Shoulders 108A and 108B are formed at the junction between cylindrical surfaces 102 and 106 and between cylindrical surfaces 104 and 106. The shoulders 108A and 108B can mount the pin-shaft 100 onto the carrier base 60 and the carrier plate 70, and fix the position of the pin-shaft 100 axially.

As noted above, FIGS. 1-14 illustrate some embodiments of the traction drive having a single loading roller and two support rollers each with a first, second, and third raceway. Also, these exemplary embodiments also illustrate embodiments wherein each of the loading and support rollers have first raceway with an outer diameter greater than an outer diameter of the second raceway, along with the corresponding structures for the sun roller and the outer ring. As noted, a different number of raceways is possible as well as a different structure for the sun roller and outer ring wherein their structures are adapted for contacting each loading and support rollers having first raceways with an outer diameter that is less than the outer diameter of the second raceways.

When the traction drive A is fully assembled, as shown by way of example in FIGS. 1 through 4, the inner raceway 42 of the outer ring 40 is offset eccentric to the cylindrical raceways 12A and 12B on the sun roller 10. The loading planetary roller 20 and two support rollers 30 are assembled in the annular space between the outer ring 40 and the sun roller 10. The first and third raceways 22 and 29 of the loading roller 20 are, respectively, in frictional contact with the first and second raceways 12A and 12B on the sun roller 10. The second raceway 26 of the loading roller 20 is in frictional contact with the inner raceway 42 on the outer ring 40. Similarly, the first and second raceways 36 and 39 of each of the support rollers 30 are respectively in frictional contact with the first and third raceways 12A and 12B on the sun roller 10 and the second raceway 38 of the support roller 30 is in frictional contact with the inner raceway 42 of the outer ring 40.

In some embodiments, the diametrical ratio of the first or/and third raceway to the second raceway as $\phi_L$ for the loading roller 20 can be defined. This diametrical ratio of the first or/and third raceway to the second raceway as $\phi_S$ for the support roller 30. $\phi_L$ and $\phi_S$ can be substantially the same. This can be mathematically illustrated as in equation (1).

$$\phi_L = \phi_S = \phi \quad (1)$$

The diametrical ratio of the inner raceway 42 of the outer ring 40 to the first or/and second raceways 12A or/and 12B of the sun roller 10 can be defined as $SR_0$. As such, the speed ratio SR of the traction drive can be defined by a mathematical equation such as shown in equation (2), by way of example.

$$SR = \phi \cdot SR_0 \quad (2)$$

$SR_0$ represents the speed ratio for conventional planetary traction drives as disclosed by Dieterch in U.S. Pat. No. 1,093,922, by Nelson in U.S. Pat. No. 3,945,270 and by Xiaolan Ai in U.S. Pat. No. 6,981,930. SR is the speed ratio of the sun roller 10 to the outer ring 40.

From the relationship as illustrated in equation (2), the speed ratio SR can be extended by a factor of $\phi$. Where $SR_0=6$, and $\phi=2$, a speed ratio of 12, e.g., SR=12, can be provided by some embodiments as described in this disclosure.

During operation, as torque load exerts on the sun roller 10 through the shaft 16 or on the outer ring 40 through the outer ring hub 50, the friction forces at the contacts between the loading roller 20 and the sun roller 10 and between the loading roller 20 and the outer ring 40 pull the loading roller 20 toward an end of the wedge gap that is narrower or smaller. This operational relationship is illustrated geometrically in FIG. 15, by way of example. Since the loading roller 20 is flexibly supported within the wedge gap, the loading roller 20 moves within or along wedge gap 112 in accordance the applied torque and the stiffness of the contacts and the pin shaft assembly 90 including the flexible bearing seats 99A and 99B as provided by elastic inserts 140A and 140B, respectively and by way of example.

Figure 15:
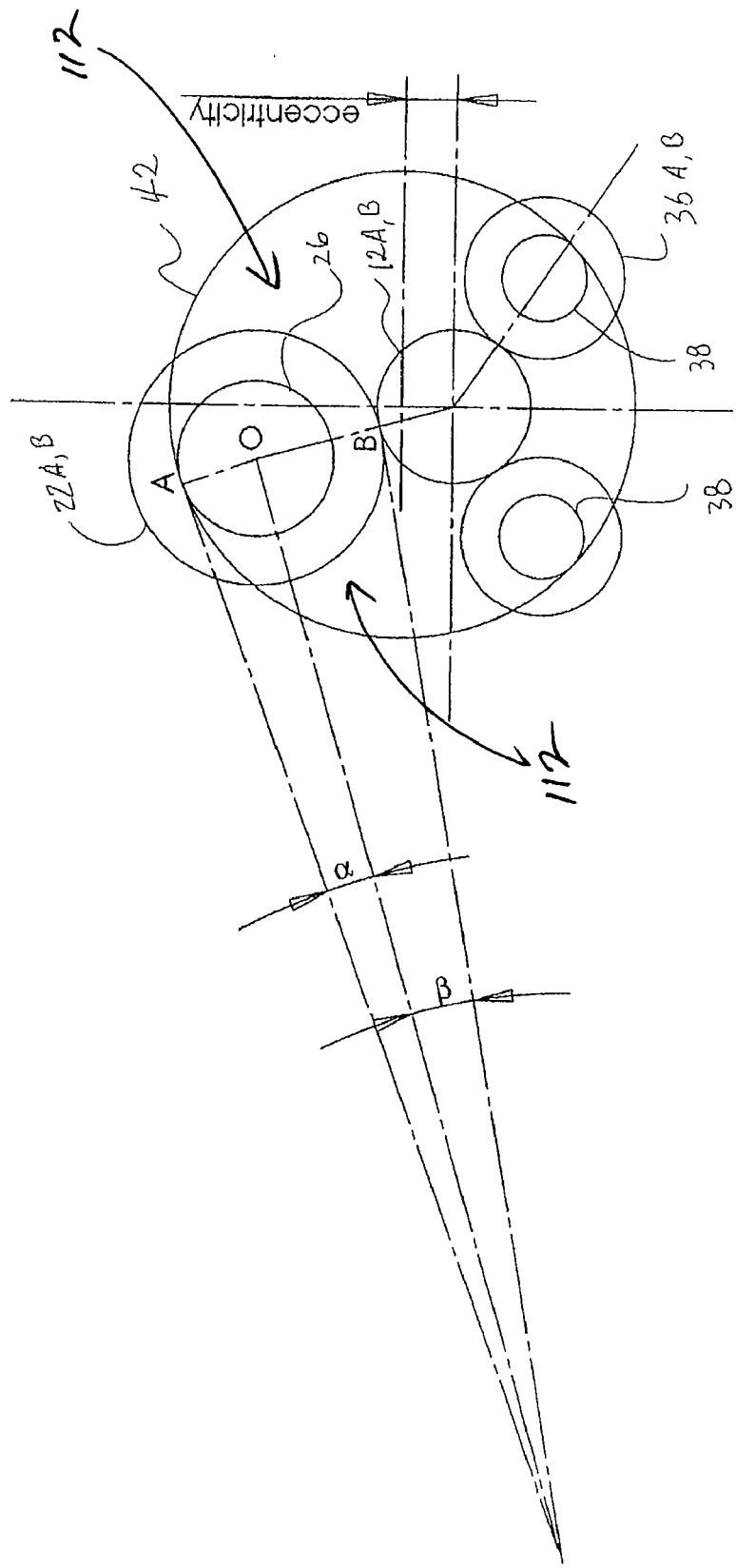
FIG. 15 is an graphical representation of the geometry for components of a traction drive according to one exemplary embodiment.

Assume for a given torque load, the center of loading roller is moved to an equilibrium position O as shown in FIG. 15. The second raceway 26 of the loading roller 20 contacts the inner raceway 42 on the outer ring 40 at contact point A. The first raceway 22 and also possibly the third raceway 29 of the loading roller 20 contacts the raceway 12A and/or 12B on the sun roller 10 at contact point B. The tangential line from contact point A intersects the tangential line from contact point B at point C. Angle <ACO represents a half wedge angle α a at contact point A, and angle <BCO represents a half wedge angle β at contact point B.

The stiffness $K_S$ (also referred to as the spring rate) is provided by the flexible bearing seats 99A, 99B, that at least be provided in part by elastic inserts 140A, 140B, by way of example. The equivalent stiffness at contact point A is stiffness $K_{CA}$ and the equivalent stiffness at contact point B is stiffness $K_{CB}$.

For a torque-actuated loading mechanism such as a traction drive to be effective, the slide between the two raceways at the contact points A and B should be minimal. As such, the operational relationship of the traction drive according to some embodiments can be described by mathematical expressions, such as the exemplary equations (3) and (4).

$$\mu_{max\_A} \geq \frac{\frac{K_S}{K_{CA}\sin\alpha} + \frac{\sin\alpha\cos\alpha}{\sqrt{\frac{1}{\phi^2} - \sin^2\alpha}} + \sin\alpha}{\cos\alpha + \sqrt{\frac{1}{\phi^2} - \sin^2\alpha}} \quad (3)$$

$$\mu_{max\_B} \geq \frac{\frac{K_S}{K_{CB}\sin\beta} + \frac{\sin\beta\cos\beta}{\sqrt{\phi^2 - \sin^2\beta}} + \sin\beta}{\cos\beta + \sqrt{\phi^2 - \sin^2\beta}} \quad (4)$$

In equations (3) and (4), $\mu_{max\_A}$ is the maximum available friction coefficient at contact $\mu_{max\_A}$ and $\mu_{max\_B}$ is the maximum available coefficient at contact point B.

In a special case where the stiffness $K_S$ equals zero, $K_S 0$, the exemplary relationships of equations (3) and (4) can be reduced to the relationships of equations (5) and (6), respectively.

$$\mu_{max\_A} \geq \frac{\frac{\sin\alpha\cos\alpha}{\sqrt{\frac{1}{\phi^2} - \sin^2\alpha}} + \sin\alpha}{\cos\alpha + \sqrt{\frac{1}{\phi^2} - \sin^2\alpha}} \quad (5)$$

$$\mu_{max\_B} \geq \frac{\frac{\sin\beta\cos\beta}{\sqrt{\phi^2 - \sin^2\beta}} + \sin\beta}{\cos\beta + \sqrt{\phi^2 - \sin^2\beta}} \quad (6)$$

In other embodiments, the diametrical size of the second raceways of the rollers can be reversed with the first and third raceways of the rollers. In other words, for each roller the second raceways can be larger in diameter than the first and third raceways. One exemplary embodiment of such an arrangement is shown by way of example in FIG. 16. As shown in this exemplary embodiment that could apply to both the loading roller 20 and the support roller 30, the first raceways 22, 36 and the third raceways 29, 39 have diameters that are less than the diameter of the second raceways 26. As such, the diametrical ratio φ is defined as the ratio larger diameter to the smaller diameter. As noted above, the sun roller 10 and the outer ring 40 and their raceway diameters would be adapted to corresponding contact this alternative embodiment. For example, the outer ring 40 could include two inner 42 and the sun roller 10 could have a single raceway 12 for coupling to the raceways of the loading roller 20 and the supporting rollers 30.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

For those skilled-in-the-art, other configurations embodying the spirit of the current disclosure are possible. Those skilled in the art will also recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A traction drive transmission comprising:
an outer ring having a circular raceway presented inwardly;
a sun roller having a raceway presented outwardly toward the raceway of the outer ring and being offset eccentrically with respect to the outer ring so that a wedge gap exists between the raceways of the outer ring and sun roller;
support rollers located between the outer ring and sun roller and having first and second raceways that differ in diameter, the support rollers contacting the raceway of the sun roller along their first raceways and the raceway of the outer ring along their second raceways; and
at least one loading roller located at the wedge gap between the raceways of the outer ring and sun roller and having first and second raceways that differ in diameter, each loading roller contacting the raceway of the sun roller along its first raceway and the raceway of the outer ring along its second raceway.

2. The traction drive transmission of claim 1 wherein the raceways are cylindrical.

3. The traction drive transmission of claim 1, further comprising a pin shaft assembly having a cylindrical shaft configured for mounting each loading roller within the wedge gap.

4. The traction drive transmission of claim 3 wherein the pin shaft assembly includes one or more elastic bearing seats positioned about the cylindrical shaft, each elastic bearing seat dimensioned for seating a bearing and configured for flexibly mounting each loading roller within the wedge gap.

5. The traction drive transmission of claim 1 wherein a first ratio defined by the diameter of the first raceway to the second raceway of the support rollers is substantially equal to a second ratio defined by the diameter of the first raceway to the second raceway of each loading roller.

6. The traction drive transmission of claim 1 wherein for each of the loading and support rollers the first raceways have an outer diameter greater than an outer diameter of the second raceways.

7. The traction drive transmission of claim 6 wherein each loading roller includes a third circular raceway having a diameter substantially equal to the diameter of the first raceway of each loading roller, the third raceway contacting the raceway of the sun roller and wherein the second raceway is positioned between the first raceway and the third raceway.

8. The traction drive transmission of claim 7 wherein the sun roller includes a first raceway, a second raceway, and an intermediate portion separating the second raceway from the first raceway, and wherein the first raceway of each loading roller contacts the first raceway of the sun roller and the third raceway of each loading roller contacts the second raceway of the sun roller.

9. The traction drive transmission of claim 8 wherein each of the support rollers includes a third circular raceway having a diameter substantially equal to the diameter of the first raceway of the support rollers and wherein the first raceways of the support rollers contact the first raceway of the sun roller and third raceways of the support rollers contact the second raceway of the sun roller.

10. The traction drive transmission of claim 8 wherein for the sun roller a diameter of the first raceway is substantially equal to a diameter of the second raceway and where a diameter of the intermediate portion is greater than the diameters of the first raceway and the second raceway.

11. The traction drive transmission of claim 7 wherein each loading roller includes a base planet containing the first raceway and a disc planet containing the third raceway.

12. The traction drive transmission of claim 1 wherein each loading roller includes two bearing seats, further comprising a first bearing positioned in a first of the two bearing seats and a second bearing positioned in a second of the two bearing seats.

13. The traction drive transmission of claim 1 wherein the outer ring includes a plurality of alternating extrusions and recesses forming teeth presented outwardly on its outer diameter, further comprising an outer ring hub having recesses forming teeth configured for coupling with the teeth of the outer ring, a connecting hub and a shaft.

14. The traction drive transmission of claim 13, further comprising a carrier base having an orifice for receiving the sun roller, a carrier plate, and a housing defining a chamber and a shaft hole, the outer ring, loading rollers and support rollers being positioned between the carrier base and the carrier plate, the outer ring being positioned about the carrier plate for engaging the teeth of the outer ring hub, and the housing being coupled to the carrier base and enclosing the outer ring, loading rollers, support rollers, and the outer ring hub within the chamber with the shaft of the outer ring hub being positioned within the shaft hole of the housing, wherein the shaft of the outer ring hub is parallel to and offset eccentrically from the sun roller.

15. The traction drive transmission of claim 1 wherein for each of the loading and support rollers the second raceways have an outer diameter greater than an outer diameter of the first raceways.

16. The traction drive transmission of claim 15 wherein each loading roller includes a third circular raceway having a diameter substantially equal to the diameter of the first raceway of each loading roller, the third raceway contacting the raceway of the sun roller and wherein the second raceway is positioned between the first raceway and the third raceway.

17. The traction drive transmission of claim 16 wherein the sun roller includes a first raceway, a second raceway, and an intermediate portion separating the second raceway from the first raceway, and wherein the first raceway of each loading roller contacts the first raceway of the sun roller and the third raceway of each loading roller contacts the second raceway of the sun roller.

18. The traction drive transmission of claim 17 wherein each of the support rollers includes a third circular raceway having a diameter substantially equal to the diameter of the first raceway of the support rollers and wherein the first raceways of the support rollers contact the first raceway of the sun roller and the third raceways of the support rollers contact the second raceway of the sun roller.

19. A traction drive transmission comprising:
an outer ring having a circular raceway presented inwardly;
a sun roller having two circular raceways presented outwardly toward the raceway of the outer ring and being offset eccentrically with respect to the outer ring so that a wedge gap exists between the raceways of the outer ring and sun roller;
support rollers located between the outer ring and sun roller and having first, second and third raceways, the second raceway being positioned between the first and third raceways and the diameter of the first and third raceways being substantially equal and different than the diameter of the second raceways, the support rollers contacting the raceway of the sun roller along the first raceways and third raceways and the raceway of the outer ring along the second raceways; and
at least one loading roller located at the wedge gap between the raceways of the outer ring and sun roller and having first, second, and third circular raceways, the second raceway being positioned between the first and third raceways and the diameter of the first and third raceways being substantially equal and different than the diameter of the second raceways, each loading roller contacting the raceway of the sun roller along the first raceways and third raceways and the raceway of the outer ring along the second raceways.

20. The traction drive transmission of claim 19 wherein a first ratio defined by the diameter of the first raceway to the second raceway of the support rollers is substantially equal to a second ratio defined by the diameter of the first raceway to the second raceway of each loading roller.

21. The traction drive transmission of claim 19, further comprising a pin shaft assembly having a cylindrical shaft configured for mounting each loading roller within the wedge gap, the pin shaft assembly including at least one elastic bearing seat positioned about the cylindrical shaft, each elastic bearing seat dimensioned for seating a bearing and configured for flexibly mounting each loading roller within the wedge gap.

22. The traction drive transmission of claim 19 wherein for each of the loading and support rollers the first and third raceways have an outer diameter greater than an outer diameter of the second raceways.

23. The traction drive transmission of claim 19 wherein for each of the loading and support rollers the first and third raceways have an outer diameter less than an outer diameter of the second raceways.

24. The traction drive transmission of claim 19 wherein the sun roller includes a first raceway, a second raceway, and an intermediate portion separating the second raceway from the first raceway, and wherein the first raceway of each loading roller contacts the first raceway of the sun roller and the third raceway of each loading roller contacts the second raceway of the sun roller.

25. The traction drive transmission of claim 19 wherein each loading roller includes a base planet containing the first raceway and a disc planet containing the third raceway.

26. The traction drive transmission of claim 19 wherein each loading roller includes two bearing seats, further comprising a first bearing positioned in a first of the two bearing seats and a bearing positioned in a second of the two bearing seats.

27. The traction drive transmission of claim 19 wherein the outer ring includes a plurality of alternating extrusions and recesses forming teeth presented outwardly on its outer diameter, further comprising an outer ring hub having recesses forming teeth configured for coupling with the teeth of the outer ring, a connecting hub and a shaft.

28. The traction drive transmission of claim 27, further comprising a carrier base having an orifice for receiving the sun roller, a carrier plate and a housing defining a chamber and a shaft hole, the outer ring, loading rollers, and support rollers being enclosed between the carrier base and the carrier plate, the outer ring being positioned about the carrier plate for engaging the teeth of the outer ring hub, and the housing being coupled to the carrier base and enclosing the outer ring, loading rollers, support rollers, and the outer ring hub within the chamber with the shaft of the outer ring being positioned within the shaft hole of the housing, wherein the shaft of the outer ring is parallel to and offset eccentrically from the sun roller.

* * * * *